United States Patent [19]

Kim

[11] 3,767,420

[45] Oct. 23, 1973

[54] ARTICLE FOR PRODUCING A BEVERAGE

[76] Inventor: Jong-Seung Kim, Ann Arbor, Mich.

[22] Filed: Feb. 9, 1972

[21] Appl. No.: 224,810

[52] U.S. Cl. ................................. 426/77
[51] Int. Cl. ..................... B65b 29/04, B65b 29/02
[58] Field of Search ............ 99/77.1, 171 P, 171 B; 206/DIG. 32, .5; 220/53, 54; 161/7, 14

[56] References Cited
UNITED STATES PATENTS

| | | | |
|---|---|---|---|
| 1,010,721 | 12/1911 | Brown | 99/171 P X |
| 975,874 | 11/1910 | Korn et al. | 99/77.1 UX |
| 2,133,166 | 10/1938 | Fritsche | 99/77.1 UX |
| 3,389,650 | 6/1968 | Michielsen | 99/77.1 UX |
| 3,607,302 | 9/1971 | Beck | 99/77.1 |

Primary Examiner—Frank W. Lutter
Assistant Examiner—William L. Mentlik
Attorney—Olsen & Stephenson

[57] ABSTRACT

A package for producing a beverage that includes a sealed plastic bag and at least one beverage cone in the bag. The cone can be removed from the bag and can be used to produce a beverage by contacting a liquid with the ingredients of the cone. The latter contains particulate material for making the beverage, and in a preferred embodiment ground coffee comprises the particulate material which is confined within a filter paper enclosure. A means is provided for suspending the cone in an inverted position during the time that the particulate coffee is contacted by hot water.

7 Claims, 4 Drawing Figures

PATENTED OCT 23 1973 3,767,420

ARTICLE FOR PRODUCING A BEVERAGE

BACKGROUND OF THE INVENTION

The present invention relates to a product for making one or more cups of coffee or other beverage, and to an article of merchandise that can be sold or dispensed for this purpose.

It is conventional practice to produce a cup of coffee by passing hot water through drip grind coffee contained in a filter paper cone. Initially a circular filter paper is folded into a cone by folding the flat circle in half, and then folding it again to a quarter fold. The filter paper is spread into a cone by separating the third and fourth layers, after which the paper cone is fitted into a funnel-like structure. A measure of drip grind coffee is then placed in the filter paper cone and a measure of hot water is slowly poured over the drip grind coffee and the beverage that is discharged from the funnel is collected in a cup or other suitable container.

To produce coffee in the manner described requires a special funnel and circular filter paper adapted to be folded in the shape of a cone which will fit the funnel. It also requires proper measurement on the part of the user of the coffee and measurement of a fixed quantity of water to be poured over the drip grind coffee in the filter cone. Thus, there are inconveniences and difficulties that exist with producing coffee in this manner.

A SUMMARY OF THE INVENTION

The present invention is directed to prefabricated coffee cones which can be sold or dispensed in sealed containers. The coffee cones are constructed and arranged so that a designated volume of hot water, such as that equal to one cup, can readily be poured over the cone, or the cone can be dipped into the hot water in the cup to provide a cup of coffee. The invention is not limited to the use of a cone of a size to produce merely one cup, but the cone can be any suitable dimension so that a fixed number of cups, such as six cups, can be prepared on one occasion. The invention is directed primarily toward a cone that can be used for producing coffee, but other beverages may likewise be produced. Thus, tea can be produced in this manner, as well as hot chocolate, or other beverages.

According to a preferred embodiment of the present invention, a package is provided for producing a beverage comprising a sealed container, and at least one beverage cone enclosed in the container. The beverage cone comprises a filter element formed of filter paper in the shape of a cone that is open at its base, a measured quantity of particulate material within said filter element which when contacted with a liquid will produce such beverage, and a closure member closing the open base of the cone-shaped filter element. The closure member has a sheet of filter paper bonded to the filter paper of the filter element so that the particulate material is completely confined within the filter paper. The closure member also includes an apertured plate on the inner surface of the sheet of filter paper, and a suspension means is connected to the plate for suspending the beverage cone in an inverted position. The closure member is secured to the filter element inwardly of the lower edge of the cone so as to form a recessed bottom wall. In one form of the invention the particulate material is drip grind coffee, and it is adapted to be contacted by hot water.

Thus, it is an object of the present invention to provide an improved package for producing a beverage such as coffee, and also to produce a special beverage cone that can be enclosed in the container of the package.

Other objects of this invention will appear in the following description and appended claims, reference being had to the accompanying drawings forming a part of this specification wherein like reference characters designate corresponding parts in the several views.

DESCRIPTION OF THE PREFERRED EMBODIMENTS

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

Figure 1:
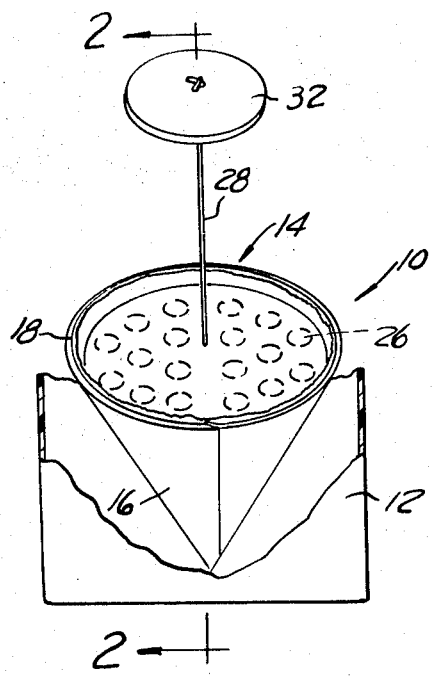
FIG. 1 is a fragmentary illustration of a package embodying the present invention with a portion of the sealed container removed and a suspension means of the beverage cone extended to a position for lifting the beverage cone from the container and introducing it into a cup.
Figure 2:
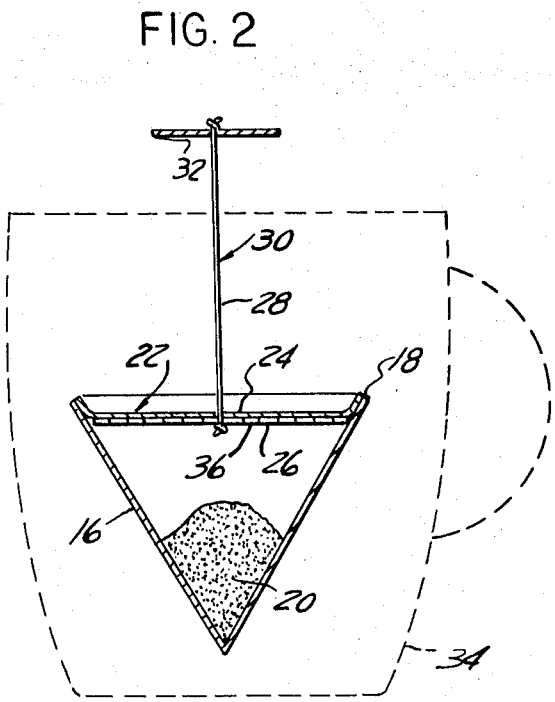
FIG. 2 is a sectional view of the beverage cone shown inserted in a cup that is illustrated in phantom.

Referring now to the drawing, the embodiment of the invention illustrated in FIGS. 1 and 2 will be described first. As there shown, the package 10 for producing the beverage comprises a sealed container 12 which can be made of any suitable plastic material that can be heat-sealed to confine the beverage cone 14. The beverage cone 14 has a filter element 16 which is formed of conventional filter paper in the shape of a cone that is open at its base 18. A measured quantity of particulate material 20, in this instance drip grind coffee, is contained within the filter element 16. A closure member 22 closes the open base 18, and it includes a sheet of filter paper 24, bonded around its periphery to the filter paper of the filter element 16 so that the particulate material 20 is completely enclosed within the filter paper. In this embodiment of the invention the filter paper 24 is more porous than the filter paper of element 16 to allow liquid to be introduced into element 16 more readily than it can flow out thereof. The closure member 22 also includes an apertured plate 26 on the inner surface of the sheet 24 to provide a relatively rigid closure member and to which a string 28 is attached to provide a suspension means 30 for the beverage cone 14. The suspension means 30 also includes a tab 32 to aid in holding the beverage cone in the position illustrated in FIG. 2.

In operation, hot water can be introduced into the cup 34 in an amount corresponding to that required to make a cup of coffee, and the filter cone can then be lowered into the cup of hot water until completely submerged, after which it can be elevated and a limited quantity of water will be trapped within the filter element 16 and also within the closure member 22 for passage through the coffee and filter cone back into the cup. It will be observed that the closure member 22 provides a recessed bottom wall for the cone 16 so that a limited amount of water can be retained therein. This water will flow through the filter paper 24 and the apertures 36 in the plate 26 so that the warm water can pass through the particulate matter 20 at a controlled rate to provide a desired beverage in the cup 34.

The present invention is particularly adapted for producing a beverage such as coffee, but other beverages can be produced by using a liquid other than water or by using a different particulate material within the beverage cone 16. Thus, hot chocolate can be produced by having chocolate within the cone and introducing the cone into warm milk, for example.

Figure 4:
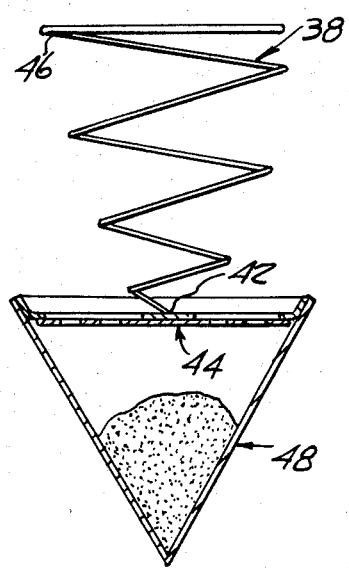
FIG. 4 is a side elevational view, partly in section, of the modified beverage cone showing the suspension means in its extended position.
Figure 3:
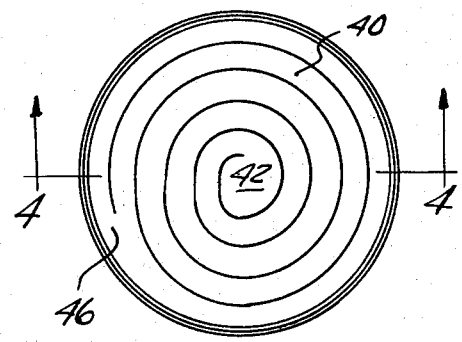
FIG. 3 is a top plan view of a modified form of the beverage cone which has a different suspension means from that shown in the embodiment of FIGS. 1 and 2.

Attention is next directed to FIGS. 3 and 4 which show a modified form of the invention. This embodiment of the invention differs in that it has a different suspension means 38 from that which is shown in FIGS. 1 and 2. In this embodiment of the invention the suspension means 38 comprises a sheet of plastic material 40 which is bonded at its center 42 to the center of the closure member 44. The sheet 40 has a tear strip that is spiral-shaped and which originates at the circular segment 46 adjacent to the outer periphery of the closure and terminates in fixed relation to the bonded center 42 of the sheet. When it is desired to suspend the beverage cone 48 by the suspension means 38, the latter is initially unwound, starting at the circular end 46 until fully extended to the position shown in FIG. 4. The beverage cone 48 can then be used in the same manner that was described with respect to the beverage cone 16.

It is claimed:

1. A beverage cone for producing a beverage from a measured quantity of particulate material that is to be contacted by a liquid to produce the beverage, comprising a filter element formed of filter material in the shape of a cone that is open at the base, a measured quantity of particulate material in said cone, and a closure member closing the base of the cone, said closure member including an apertured plate, a sheet of filter material that is secured to said filter element at the base of the cone so that said particulate material is completely confined within filter material, and suspension means connected to said plate for suspending the beverage cone in an inverted position, said closure member being secured to the filter element at a location inward from said base to form a recessed bottom wall so that when the beverage cone is suspended in an inverted position a limited quantity of liquid can be retained in the recessed bottom wall for passage into and through said cone thereby contacting the particulate material.

2. The beverage cone that is defined in claim 1, wherein said suspension means comprises a string secured to the center of said apertured plate.

3. The beverage cone that is defined in claim 1, wherein said filter element and said sheet of filter material are filter paper.

4. The beverage cone that is defined in claim 3, wherein said particulate material is coffee.

5. A package for producing a beverage comprising a sealed container, at least one beverage cone enclosed in said sealed container, said beverage cone comprising a filter element formed of filter paper in the shape of a cone that is open at its base, a measured quantity of particulate material within said filter element which when contacted by a liquid will produce said beverage, a closure member closing the open base of the cone-shaped filter element, said member including a sheet of filter paper bonded to the filter paper of said filter element so that said particulate material is completely confined within filter paper, said member also including an apertured plate on the inner surface of said sheet and a suspension means connected to said plate for suspending said beverage cone in an inverted position, said closure member being secured to said filter element inwardly of the base so as to form a recessed bottom wall.

6. The package that is defined in claim 5 wherein said particulate material is coffee.

7. A beverage cone for producing a beverage from a measured quantity of particulate material that is to be contacted by a liquid to produce the beverage, comprising a filter element formed of filter material in the shape of a cone that is open at the base, a measured quantity of particulate material in said cone, and a closure member closing the base of the cone, said closure member including an apertured plate, a sheet of filter material that is secured to said filter element at the base of the cone so that said particulate material is completely confined within filter material, and suspension means connected to said plate for suspending the beverage cone in an inverted position, said closure member being secured to the filter element at a location inward from said base to form a recessed bottom wall so that when the beverage cone is suspended in an inverted position a limited quantity of liquid can be retained in the recessed bottom wall for passage into and through said cone thereby contacting the particulate material, said suspension means comprising a sheet of plastic material bonded at its center to the center of said closure member, said sheet having a spiral tear strip originating adjacent to the outer periphery of the closure and terminating in fixed relation at the bonded center of the sheet.

* * * * *